United States Patent [19]

Willetts

[11] Patent Number: 4,690,069
[45] Date of Patent: Sep. 1, 1987

[54] SUSPENSION FOR AXLE CONTROL WITH EMPTY CAR SPRING

[76] Inventor: Elwood H. Willetts, 102 S. Penataquit Ave., Bay Shore, N.Y. 11706

[21] Appl. No.: 855,990

[22] Filed: Apr. 25, 1986

[51] Int. Cl.$^4$ ................................................ B61F 5/30
[52] U.S. Cl. .............................. 105/224.1; 105/165; 105/218.2; 267/3; 267/273; 280/687; 280/717
[58] Field of Search ................... 105/157 R, 165–168, 105/194, 197 R, 197 S, 197 T, 197.2, 218 R, 218 A, 224.1, 157.1, 197.05, 198.6, 198.7, 198.2, 218.1, 218.2; 267/3, 6, 57.1 A, 57.1 R; 280/80 B, 681, 687, 717

[56] References Cited

U.S. PATENT DOCUMENTS

| | | | |
|---|---|---|---|
| 2,051,864 | 8/1936 | Knox et al. | 280/681 |
| 2,305,732 | 12/1942 | Piron | 105/194 |
| 3,013,808 | 12/1961 | Willetts | 267/57.1 R |
| 3,101,938 | 8/1963 | Hirst | 267/3 |
| 3,777,672 | 12/1973 | Schneider | 105/224.1 |
| 3,948,188 | 4/1976 | Zehnder | 105/197 T |
| 4,166,611 | 9/1979 | Geers et al. | 105/224.1 |
| 4,385,857 | 5/1983 | Willetts | 105/159 |

FOREIGN PATENT DOCUMENTS 928105 5/1955 Fed. Rep. of Germany ... 105/224.1

Primary Examiner—Robert B. Reeves
Assistant Examiner—Donald T. Hajec
Attorney, Agent, or Firm—Nolte, Nolte and Hunter

[57] ABSTRACT

Spring suspensions for the sprung mass of railway cars are disclosed and which provide torque arm support of both empty and loaded cars and control of axle movement, as in curving by hinging the outer ends of radial torque arms in support of the sprung mass above the vertical axes of the axles of the railway car trucks in which the inner ends of the torque arms are integral with hubs of torque reactive, loaded car spring elements mounted on the journal boxes and in which the hubs are concentric with the axles. In a construction where the loaded car spring elements are mounted on a cross bolster between a pair of axles at the ends of high productivity cars, axes of the spring elements are positioned above the axes of the axles and the outer ends of the torque arms are connected to the journal boxes. In either construction, empty car spring elements are disclosed which are interposed between the sprung mass and the car axles and which are hinged to the ends of torque arms of the loaded car spring elements.

10 Claims, 5 Drawing Figures

SUSPENSION FOR AXLE CONTROL WITH EMPTY CAR SPRING

FIELD OF THE INVENTION

The invention relates generally to vertical load resistant spring suspensions for railway cars and the like, more particularly, to spring suspensions of the torque reactive elastomeric bushing type providing torque arm support of the sprung mass of both empty and loaded railway cars and control of axle movement, as in curving.

HISTORY OF THE INVENTION

The instant invention comprises an improvement in vehicle truck spring supports of the elastomeric bushing type as illustrated, for example, in FIGS. 3 and 4 of U.S. Pat. No. 4,385,857, issued May 31, 1983 to the inventor hereof, the disclosure thereof being incorporated herein by reference; and as disclosed in U.S. Pat. No. 3,013,808, issued Dec. 19, 1961 to the same inventor; and in U.S. Pat. Nos. 3,171,688; 3,856,325 and 3,893,586, also issued to the inventor hereof; and as disclosed in the same inventor's co-pending application, Ser. No. 614,741, filed May 25, 1984; now U.S. Pat. No. 4,597,337 all of said patents and application and the patent eventuating from said application being incorporated herein by reference.

The present invention is aimed at improving such torque reactive torsionally stressed elastomeric spring suspensions which were adequately designed for maximum vertical loads and fore-aft forces, but which do not adequately provide for the transverse shifting of weight as a rail car enters a curve, or for suspension spring differential requirements for empty versus loaded car weights.

The problem of providing spring support having favorable loaded and empty travel stroke characteristics is discussed in U.S. Pat. No. 3,777,672, issued Dec. 11, 1973 to Schneider who provides a spring element having several concentric rubber layers which become serially and severally employed through a cam structure.

SUMMARY OF THE INVENTION

The improvements contemplated in the present invention include the provision of uniquely designed and positioned torque arm structures which change the relative alignment of railway car truck axles from tangent to the angle of track curvature when there is a transverse shift of weight in the sprung mass due to centrifugal forces as the car wheels engage a curve in the tracks, thus reducing wheel-rail wear and rolling friction.

The invention also contemplates the combining with such torque arm structures, of empty car spring structures of the elastomeric bushing type, operative only when the car is empty, affording a low spring rate for an empty car thus permitting the application of torsional potential of the loaded car torsional spring element when the car is loaded and which, in prior constructions, is expended when the car is unloaded as radial deflection which is of less impact absorbing value than torsional resistance.

In all embodiments of the invention, the sprung mass is supported on the unsprung wheel set without metallic contact therebetween as torsionally stressed elastomeric bushings bondedly interconnect the sprung mass and each wheel set.

The invention is applicable to single axle rail car trucks and to double or twin axle rail car trucks, both of which are useful in intermodal transport systems.

In one embodiment of the invention, the journal boxes of the truck are of cylindrical exterior form, each machined for a press fit of the inner hub of the loaded car spring element which comprises a single torsionally stressed elastomeric bushing bonded concentrically between the inner hub and an outer hub. Thus, the journal bearings afford torsional freedom for the inner hub. Each hub is integral with an oppositely extending torque arm. The torque arm of the inner hub extends toward an adjacent axle in a two axle truck and toward the far end of the railway car in a single axle truck and in either case terminates at a hinge which contacts the sprung mass as the load exceeds the resistance of the empty car spring element to which it is hinged. Importantly, the axis of the hinge; which is parallel to the axis of the axle, is above the axis of the axle when the hinge contacts the sprung mass under loaded condition.

The oppositely extending torque arm which extends integrally from the outer hub, terminates at a rubber bonded shackle bracket in support of the sprung mass.

As the loaded car spring element is deflected by the loaded weight, the oppositely extending torque arms are depressed uniformly, while the end of the truck axle is moved longitudinally away from the hinge because of the arcuate movement of the outer end of the inner hub torque arm hinged higher than the truck axle. The shackle at the outer end of the other or outer hub torque arm provides the freedom for such movement.

In such a simple construction, with the shift of weight transversely, as a car enters a curve, the relative alignment of truck axles is changed from tangent to the angle of track curve, the outer wheels moving away from one another, the inner wheels moving toward one another. Thus, reducing wheel-rail wear and rolling friction.

In this embodiment of the invention, the empty car spring element, which is operative only when the car is empty, is bracketed under the sprung mass on a rubber bush.d shaft and is disposed near the hinged end of the torque arm which is integral with the inner hub of the loaded car spring element. In a two-axle rail car truck, the empty car spring element also comprises a single torsionally stressed elastomeric bushing bonded concentrically between an inner and an outer hub, the inner hub of which is bushed to the rubber bushing on the empty car element shaft allowing torsional freedom for the inner hub. Each of the hubs is integral with an adjacent hinge via oppositely extending arms, the hinges being connected to the respective outer ends of the torque arms which are integral with the inner hubs of the loaded car spring elements press fit to the journal boxes of the axles.

The arrangement of loaded and empty car spring elements is, of course, the same on either side of each wheel set.

Torsional deflection of the elastomeric bushing of each empty car spring element is restricted by vertical contact between the sprung mass and the hinges as the weight of the sprung mass exceeds the resistance of the empty car spring element. At that point, the hinged ends of the loaded car spring elements become fixed, as noted before, above the center of the axles. The empty spring elements become inoperative and the loaded car spring elements take over. Further deflection of the sprung mass moves the axles further apart; i.e., increases the wheel base. As previously noted, a shift in transverse loading, when curving, will effect an aligning of the axles with the angle of curve.

In an embodiment of the invention, particularly applicable to two axle rail car trucks for supporting an end of a 100 ton coal car, for example, or other high productivity railway cars, a bolster is centered between and above the vertical center of the supporting axles. The oppositely extending torque arms extend from respective hubs which are bonded to the inner and outer circumferential surfaces of the annular torsionally stressed elastomeric bushing and in the absence of an empty car spring element, are secured at their outer ends to the journal boxes of the axles. The inner hub is bushed on an elastomeric bushing which is bonded to the bolster end, the bolster having its center above the vertical center of the axles to assure that shifting of load, transversely as the railway car enters a curve, effects a displacement of the axles to the angle of track curve.

When empty car spring elements are desired, they are incorporated in the torque arms extending from the bolster to the journal boxes. A tubular shaft extends from the end of each torque arm where it may be secured or the ends may be secured in brackets formed integrally with its respective journal box. A torsionally stressed elastomeric bushing is bonded at its inner surface to each shaft and is bonded, at its outer surface to a hub which is integral with the respective journal box in the case where the shaft is secured to the torque arm; the hub being integral with the torque arm in the instance where the shaft is secured to the journal bnox bracket. The outer end of each torque arm provides an extension positioned above the journal box. As load exceeds the weight of the empty car spring element, the elastomer deflection in the empty car spring element has lowered the overhanging torque arm extension into vertical contact with the top of the journal box and the empty car spring element is then inoperative and the loaded car spring elements takes over.

The torsional resistance in the various spring elements incorporated in the suspension of the invention will vary with the application of the invention to the various modes of carrying out the invention and with the incorporation of the invention in rail cars of varying functions and of varying empty and loaded weights.

In this last respect, the invention is adaptable for suspensions with diverging torque arms of unequal length, which may be desirable where structural limitations preclude excessive lengths of stressed elastomeric bonding or where less transverse freedom is desired between each journal box and the spring mass, as in hunting, for example.

The constructions of the invention are also applicable to four wheeled highway trailers and to tandem axle semi-trailers.

BRIEF DESCRIPTION OF THE DRAWINGS

The invention will now best be understood by reference to the following description with further reference to the accompany drawings in which.

DETAILED DESCRIPTION OF THE PREFERRED EMBODIMENTS

The constructions of the first embodiment of the invention to be described are applicable to single and two axle car trucks as used for intermodal car service.

Figure 1:
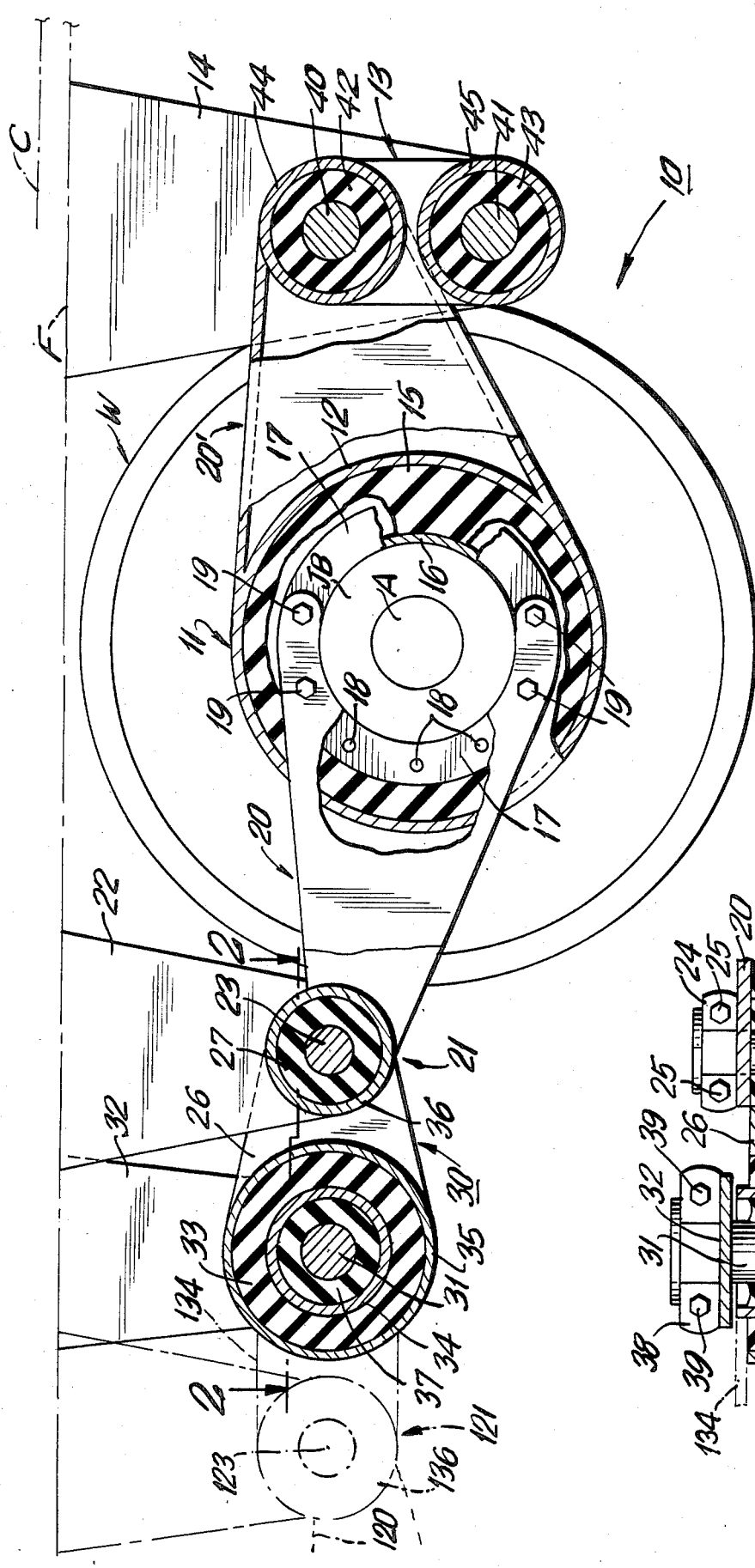
FIG. 1 is a schematic side elevational view partially in vertical section of a single axle railroad car truck incorporating the spring elements of the invention.

In FIG. 1, a single axle rail car truck 10 for supporting a railroad car C is shown and comprises a frame F supported by axle A, on the transverse ends of which, near side flanged wheel W and far side flanged wheel (not shown) are secured. In this construction, the frame 12 and car C comprise the sprung mass supported by the suspension of the invention.

The ends of the axle are journaled in journal boxes, only the rear side journal box JB being shown. The loaded car spring element 11 comprises a pair of torque arms 20', 20 extending integrally from outer and inner hubs 12, 16 to which the outer and inner circumferential surfaces of torsionally stressed elastomeric bushing 15 are bonded. Torque arm 20', integral with the outer hub 12 of the loaded car spring element extends to the upper hinge bushing of shackle 13, the lower hinge bushing of which is supported on bracket 14 which supports the sprung mass. In a two axle car truck, torque arm 20' would extend toward the center of the railway car while the corresponding torque arm extending from the loaded spring element of the second axle to a shackle would extend to the near end of the car. In the single axle car truck shown in full lines in FIG. 1, torque arm 20' extends toward the near end of the car.

Each journal box has a rounded exterior form which has been machined for a press fit of an inner hub 16, the radially extending flanges 17 (only the near side flange being shown) of which are drilled, as at 18 to receive bolts 19 for integrally securing the inner ends of the sides of the radial torque arm 20, which extends from its bolted connection to the hub 16 toward the adjacent axle (not shown) of a two axle car truck and in a single axle construction toward the rail car truck (not shown) at the far end of the railroad car which is provided with the same suspension elements as now being described, but in mirror image disposition with the radial torque arm thereof extending from a flanged hub toward the end of the railroad car here being described.

The outer end of the radial torque arm 20 is hinged in an elastomer bushed joint 21 to one end of an empty car spring element 30, the torque reactive, torsionally stressed elastomeric bushing 33 of which is pivotally supported on a shaft 31 with which it is integral in a single axle construction and which in a two axle construction may be bonded between inner and outer hubs 34, 35 as shown with the inner hub bushed on an elastomer bushing, integral as by bonding to the shaft, as shall be more fully discussed. The shaft 31 is clamped to bracket 32 in support of the sprung mass of the car and at a height above the center of the axle so that the upper surface of the hub 36 at the end of the arm 26 of the empty spring element 30 will contact the under surface of stop 22 secured to the frame F as the sprung mass deflects downwardly as the car becomes loaded, thus preventing further downward deflection of the empty car spring element as the weight of the sprung mass exceeds that of the empty car, at which load the empty car spring element becomes inoperative and the loaded car spring element 11 deflects as load increases.

Equalization of height of the torque arm ends between empty car and loaded car condition is maintained through torsional deflection in elastomeric bushing 15 bonded to hubs 12 and 16 and by rotation of the journal box.

At loaded weight, the end of torque arm 20 hinged at bush joint 21 is centered vertically higher than the center of car axle A so that the end of arm 20 will yet be vertically higher than the axle when-loaded car spring element 11 deflects to maximum travel. Thus, the axle A will be moved away from the hinge point of the torque arm 20 to increase the wheel base at the side of the car to which the load shifts as a curve is encountered and the axle thus is aligned with an angle of track curve.

In the construction of FIG. 1, the hinged joint 21 by which the arm 20 of loaded car spring element 11 and arm 26 of empty car spring element 30 are hinged comprises an annular elastomeric bushing 27 carried on shaft 23 which is secured to radial torque arm 20 via upper and lower mating brackets 24 on both sides of torque arm 20. The mating brackets 24 are secured by bolts 25. Either the upper bracket seen at the top of FIG. 2 or the lower bracket, may be secured to the torque arm 20 on the sides thereof.

The empty car spring element 30 shown in FIG. 1 is constructed for a two axle car truck for convenience of description and comprises annular torsionally stressed elastomer 33 bonded at its inner and outer circumferential surfaces to inner hub 34 and outer hub 35, respectively. Outer hub 35 is integral with arm 26 which is formed integrally at its outer end with hub 36 which is bushed on elastomeric bushing 27 of hinge bushing 21. Annular elastomeric bushing 37 is bonded on empty car spring element shaft 31 and inner hub 34 of the empty car spring element is bushed thereover.

Shaft 31 is clamped via mating brackets 38 on both sides of bracket 32. The mating brackets 38 are secured by bolts 39. Either the upper bracket seen at the top of FIG. 2 or the lower bracket may be secured to the bracket 32 on the sides thereof.

Figure 2:
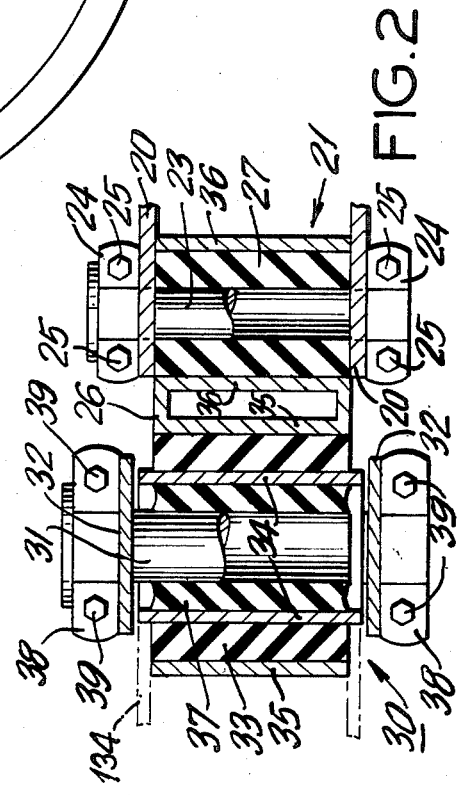
FIG. 2 is a schematic sectional view of the empty car spring element and hinge element of FIG. 1 and as generally taken along the lines 2—2 of FIG. 1.

In a two axle car truck utilizing the constructions of FIGS. 1 and 2, a second empty car spring element torque arm shown in phantom at 134 extends integrally from inner hub 34 to its end where integral hub 136 is bushed on a shaft 123 of a hinge 121 of the same construction as hinge bushing 21. The shaft acts as a hinge for a radial torque arm 120 extending integrally from an inner hub press fit to the journal box of the adjacent axle as fully depicted in FIG. 1 with reference to the single axle truck. Similarly, the loaded car spring element of the second axle which would be located at the near end of the car, would have its oppositely extending torque arm pivoted at the upper hinge bushing of a shackle to permit the longitudinal movement of the axle as just described with reference to the single axle car truck of FIG. 1.

In a single axle car truck, the empty car spring element 30 would either have the inner hub bonded to elastomer bushing 37 or would have the torque resistant elastomeric bushing 37 bonded at its inner circumference to the shaft, with the inner hub 34 eliminated.

The construction at the oppositely extending torque arm 20', the end of which is bushed to the shackle 13 is conventional in that upper and lower shafts 40 and 41 carry annular elastomeric bushings 42, 43. A hub 44 integral with torque arm 20' is bushed on bushing 42 while hub 45 integral with the shackle link is bushed on bushing 43. The shaft 41 is secured to bracket 14, the arrangement being such that the link of shackle 13 may pivot about shaft 41 and the end of torque arm 20' may pivot about shaft 40 with longitudinal movement of shaft 40 at the end of the shackle link permitting longitudinal movement of the axle A. The center of shaft 40 is preferably above the center of axle A and is in line with the center of axle 23 of hinge 21 when the car is loaded.

As previously stated, the invention also applies to a bolster mounted spring element for the weight of a loaded car and with an empty car spring element disposed in each torque arm adjacent a journal box. This mounting applies especially to two axle car trucks at the ends of high productivity integral railroad train cars as used in the transport of the products of mines and for grain, etc. Constructions embodying the inventions for this purpose are disclosed in FIGS. 3, 3A and 4.

In these figures, the loaded car spring element 60 is mounted on a cross bolster 70 extending transversely of the car C' and centered between the axles, only one of which A' is shown in the figures and above the vertical center of the supporting axles so that a deflection of the sprung mass of the car will incresae the wheel base, without added constructions, to provide curving control as in the previously described embodiment. It is to be understood that a two axle car truck, as disclosed in FIGS. 3-4, supports each end of the car.

Loaded car spring elements, only the near side one 60 of which is shown in the figures, are mounted at each transverse end of the bolster 70. Each loaded car spring element is mounted on a low torsion elastomeric bushing 61 bonded around the tubular bolster 70, such as to serve to neutralize the opposing torsional forces of the torque arms disposed oppositely for each transverse end of the bolster; that is, the oppositely extending torque arms 80, 80' integral respectively with outer hub 62 and inner hub 63 would extend respectively rearwardly and forwardly on one side of the car and respectively forwardly and rearwardly on the other side of the car.

In this last respect, the elastomeric bushings 61 is bonded to the bolster 70 at its inner circumferential surface and is bonded to the inner surface of the inner hub 63 at its outer circumferential surface. The torsionally stressed elastomeric bushing 64 of the loaded car spring element is bonded at its inner circumferential surface on the outer surface of inner hub 63 and is bonded at its outer circumferential surface to the inner surface of outer hub 62.

Figure 4:
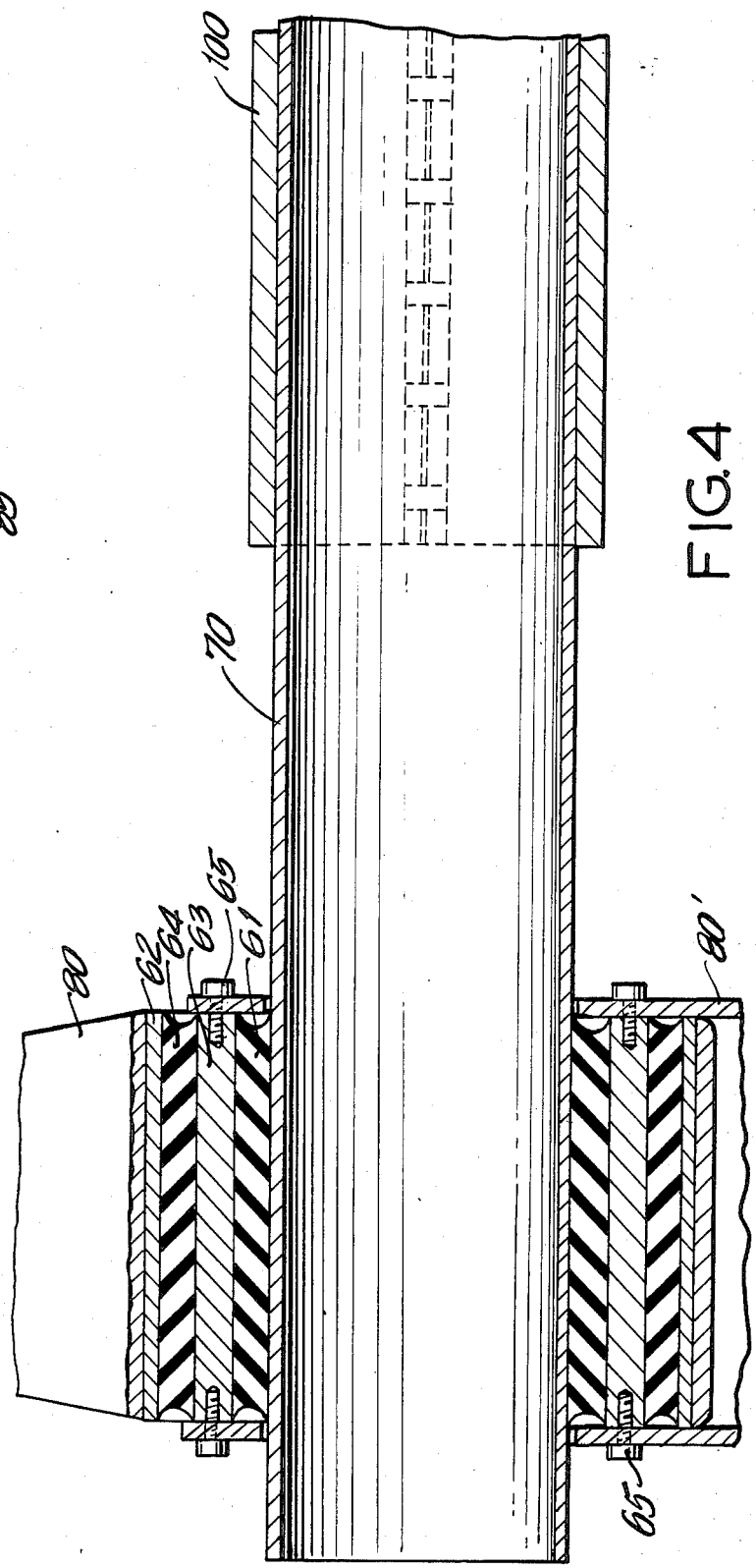
FIG. 4 is a schematic sectional view taken along the line 4—4 of FIG. 3.

The oppositely extending torque arms 80, 80' are integral with the outer and inner hubs 62, 63 as by bolting the inner end of torque arm 80' to inner hub 63 as shown in FIG. 4 at 65, and as by casting or welding or bolting torque arm 80 to outer hub 62.

Figure 3:
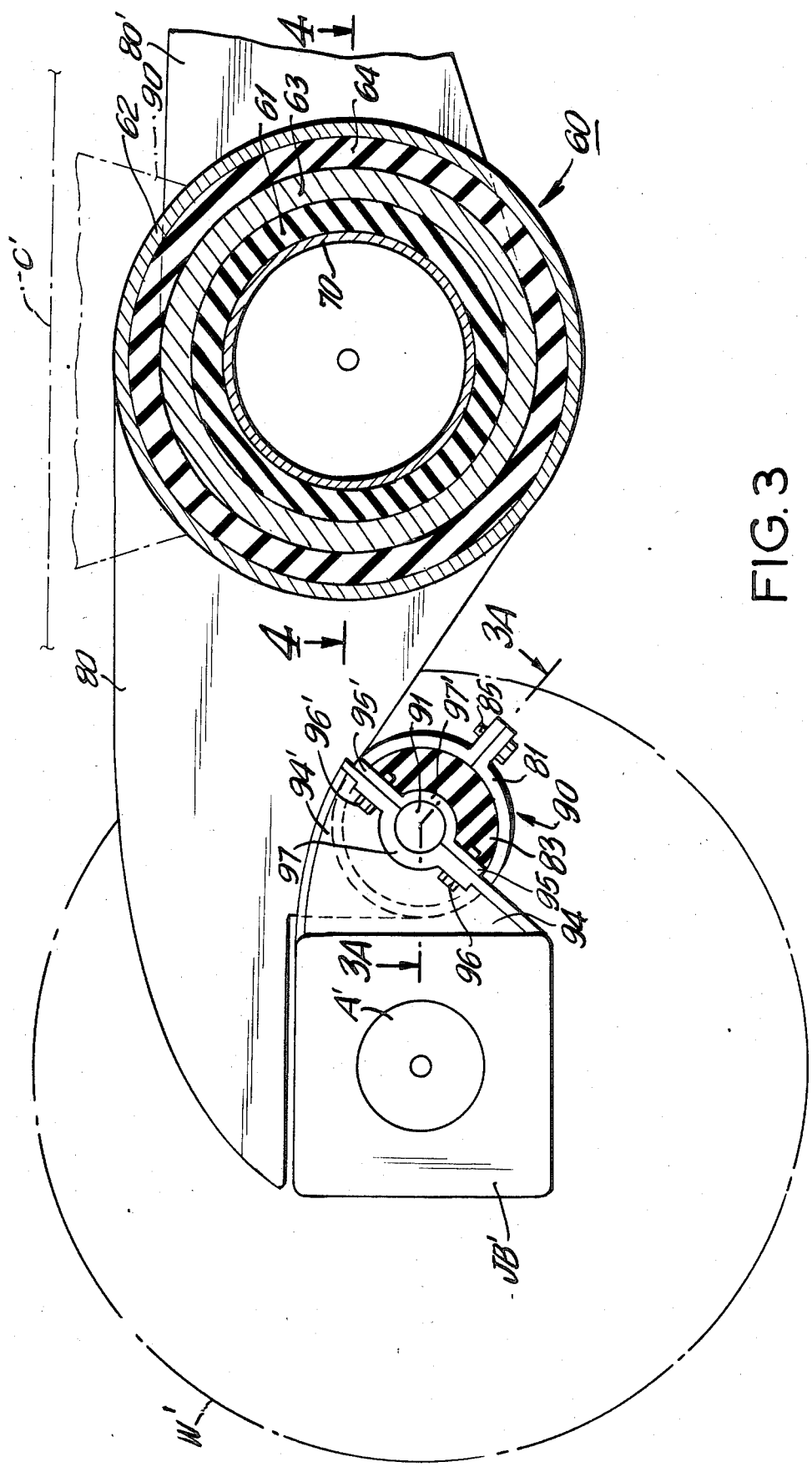
FIG. 3 is a schematic side elevational view of a railroad car truck in which the loaded car spring element is supported on a cross bolster and from which the torque arms extend to the journal boxes of a two axles car truck.
Figure 3A:
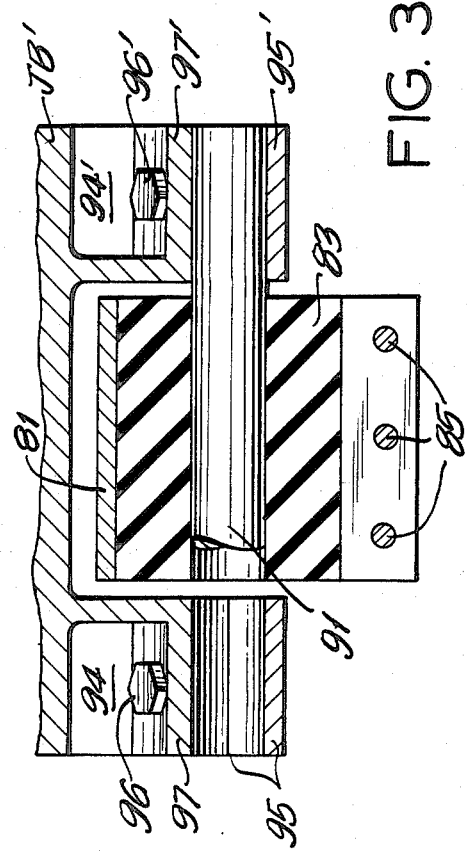
FIG. 3A is a schematic cross sectional view taken along the line 3A—3A of FIG. 3.

The cross bolster 70 supports the car via a central connection to a car center plate 100 and, therefore, as can be appreciated, the flanged wheels W', only one of which is shown in FIG. 3, the axles journal boxes JB', loaded car spring element 60 with its torque arms 80, 80' and empty car spring element 90 (now to be discussed) and cross bolster 70 comprise the truck, without a truck frame as such, disposed at each end of the high productivity railroad car.

The empty car spring elements, only one of which 90 is shown in FIG. 3, each comprise a shaft 91 secured to brackets 94, 94' via 180° caps 95, 95' bolted as at 96, 96' to cap mating portions 97, 97' formed integral with brackets 94, 94'. Torque arm 80 is formed at its outer lower end with split hub 81, bolted at its joined ends by bolting as at 85, and to which is bonded at its outer circumferential surface a torsionally stressed elastomeric bushing 83, the inner circumferential surface of which is bonded to shaft 91.

The torsional resistance of elastomeric bushing 83 is less than that of elastomeric bushing 64 of the loaded car spring element 60 and, therefore, will absorb the empty car load of the sprung mass. As the weight of the car exceeds the torsional resistance of the empty car spring element, the outer upper end of torque arm 80 which extends over the journal box JB', will come to rest on the journal box JB' at which load the loaded car spring element 60 takes over. At this point, the axis of the bolster mounted loaded car spring element 60 is still above the vertical axis of the axles A' and further deflection of the car will, therefore, effect a widening of the wheel base to effect track curvature control.

As previously stated, torque arms of unequal length are desirable where structural limitations preclude excessive lengths of stressed elastomeric bonding or where less transverse freedom is desired between the journal boxes of the single axle truck and the sprung mass, as in hunting, for example, and the provision of torque arms of unequal length is contemplated within the invention.

Equalization of the height of the ends of unequal arms during vertical movement is accomplished through torsional deflection in the elastomeric bushing bonded to the concentric hubs with which each of the opposing torque arms are integral and by rotation of the journal box on its axle.

Various further modifications to the above structures, including reversal of parts and the application of the structures to road vehicles, will now occur to those skilled in the art. The scope of the inventions, however, are to be delineated only by the following claims.

What is claimed is:

1. A suspension for the sprung mass of a vehicle such as a railway car and the like which includes at least one axle supporting a pair of wheels at respective ends, the ends being journaled in journal boxes; said suspension comprising torque arm means extending in the longitudinal direction of the car between a journal box and the sprung mass, first means mounting said torque arm means to the journal box for rotation about a center substantially at the vertical center of the axle, second means mounting said torque arm means to said sprung mass for supporting the sprung mass and for rotation about a center above the vertical center of the axle; torsion means in said torque arm means for resisting vertical deflection of the sprung mass, whereby as the sprung mass is deflected, said second mounting means travels through a relative arc and constitutes means for shifting the axle end longitudinally of the car, said torsion means comprises inner and outer hubs, an annular torsionally stressed elastomeric bushing bonded at its inner and outer circumferential surfaces to said inner and outer hubs, respectively, said torque arm means comprising a pair of oppositely, longitudinally extending torque arms, said first mounting means comprising said inner hub secured concentrically to the journal box, inner ends of said pair of torque arms being respectively integral at their inner ends with said hubs, said second mounting means comprising hinge means for mounting the outer end of one of said torque arms for rotation about a shaft centered above the vertical center of the axle, and further comprising shackle means for mounting the outer end of the other of said torque arms for longitudinal movement, empty car spring means, means hinging said empty car spring means to at least one of said torque arms, means mounting said empty car spring means above said second mounting means for supporting the sprung mass, said empty car spring means comprising second torsion means of less resistance than said first mentioned torsion means and stop means depending from the sprung mass for supporting the sprung mass on said second mounting means as the sprung mass becomes loaded and said empty car spring means is deflected downwardly.

2. The suspension of claim 1, wherein said second torsion means comprises inner and outer hubs, an annular torsionally stressed elastomeric bushing bonded at its inner and outer circumferential surfaces to said inner and outer hubs, respectively, at least one torque arm being integral at its inner end with at least one of said hubs, the outer end of said at least one torque arm being hinged at said hinge means mounting said outer end of said one of said torque arms of said first mentioned torsion means, said means mounting said empty car spring means comprising a shaft extending parallel to the axle, an elastomeric bushing bonded around said shaft, said inner hub of said second torsion means being bushed on said elastomeric bushing.

3. A suspension for the sprung mass of a vehicle such as a railway car and the like which include two axles each supporting a pair of wheels at respective ends, the ends being journaled to journal boxes, said suspension comprising torque arm means extending in the longitudinal direction of the car between a journal box and the sprung mass, first means mounting said torque arm means to the journal box for rotation about a center substantially at the vertical center of the axle, second means mounting said torque arm means to said sprung mass for supporting the sprung mass and for rotation about a center above the vertical center of the axle; torsion means in said torque arm means for resisting vertical deflection of the sprung mass, whereby as the sprung mass is deflected, said second mounting means travels through a relative arc and constitutes means for shifting the axle and longitudinally of the car said second mounting means comprises a cross-bolster extending laterally, substantially mid-way between the two axles of the vehicle and having its axis above the vertical center of the axles, an elastomeric bushing bonded around each end of said cross-bolster, said torque arm means comprising two pairs of oppositely, longitudinally extending torque arms, one of said pairs of torque arms extending between the journal boxes and sprung mass on each side of the railway car, said torsion means comprises, on each side of said railway car, inner and outer hubs, an annular torsionally stressed elastomeric bushing bonded at its inner and outer circumferential surfaces to said inner and outer hubs respectively, each said inner hub being bushed on an elastomeric bushing on a respective end of said cross-bolster, each said pair of torque arms being respectively integral at the inner ends thereof with respective inner and outer hubs of said torsion means, said first mounting means comprising means for connecting the outer ends of each said pair of torque arms with respective journal boxes on each side of the railway car, for rotation therewith about the respective axles, empty car spring means, means hinging said empty car spring means to the outer ends of said torque arms, means integral with the journal boxes connecting the outer ends of said torque arms for mounting said empty car spring means on the journal boxes for supporting the sprung mass through said torque arms and said torsion means, said empty car spring means comprising second torsion means of less resistance than said first mentioned torsion means and stop means between said empty car spring means and the journal boxes upon which they are mounted for supporting the sprung mass on said second mounting means as the empty car spring means becomes overloaded.

4. The suspension of claim 3, wherein said stop means comprises extensions of said outer ends of said torque arms and the tops of the journal boxes upon which said empty car spring means are mounted.

5. The suspension of claim 3, wherein each said empty car spring means comprises a shaft extending parallel to its associated axle, a hub concentric with said shaft, an annular torsionally stressed elastomeric bushing bonded at its inner and outer circumferential surfaces to said shaft and hub respectively, said hub being integral with one of said means mounting said empty car spring means and its respective torque arm, said shaft being secured to the other of said means mounting said empty car spring means and its respective torque arms.

6. A suspension for the sprung mass of a vehicle such as a railway car and the like which includes at least one axle supporting a pair of wheels at respective ends, the ends being journaled in journal boxes; said suspension comprising torque arm means extending in the longitudinal direction of the car between a journal box and the sprung mass with first means mounting said torque arm means to the journal box for rotation about a center substantially at the vertical center of the axle, second means pivotally mounting said torque arm means to said sprung mass, first torsion means in said torque arm means for resisting vertical deflection of the sprung mass under loaded condition, empty car spring means comprising second torsion means of less resistance than said first torsion means, means mounting said empty car spring means independently of said first torsion means for resisting downward deflection of the sprung mass under empty car condition and stop means for retarding downward deflection of the sprung mass under resistance of said empty car spring means as the sprung mass becomes loaded, whereby further downward deflection of the sprung mass is resisted solely by the deflection resistance of said first torsion means, said torque arm means comprise a pair of torque arms, hinge means interconnect said empty car spring means and an outer end of at least one of the outer ends of one of said torque arms, said means mounting said empty car spring means depends from the sprung mass and said stop means comprise juxtaposed surfaces of the sprung mass and said hinge means.

7. The suspension of claim 6, wherein said torque arm means comprise a pair of torque arms, said empty car spring means comprises hinge means for interconnecting the outer ends of said torque arms and the journal boxes of the axles, said stop means comprising juxtopposed surfaces of an extension of said outer ends of said torque arms and the journal boxes.

8. In a rail car support at each longitudinal end of a rail car, each support having a car truck having at least one axle with a journal box at each end of the axle and a torque reactive spring means disposed between each said journal box and sprung mass of said car; the combination of an empty car spring means functioning only within the weight of an empty car and a loaded car spring means functioning under the weight of a loaded car, each loaded car spring means comprising a single elastomeric bushing bondedly interconnecting a pair of concentrically disposed tubular hubs, a hub of each said loaded car spring being integral with a longitudinally extending torque radius arm hinged in support of the sprung mass at one of its ends to said sprung mass at an elevation higher than the axis of said axles, whereby, as the weight of the sprung mass shifts to the outside of a curve due to centrifugal force as said car trucks engage a track curve, the wheel base on the outside of the car curve is increased and the wheel base at the inside of the curve is decreased to align each axle with the angle of track curve thereby reducing friction and wear between rail and wheel, said loaded car spring means is disposed concentrically of each said journal box, means hinging said empty car spring means to the free end of each said torque arm which is integral with the inner hub of said loaded car spring means, said empty car spring means being bushed on a shaft clamped to the sprung mass between adjacent axles of two axle trucks of the car, said shaft being centered vertically above said hinging means and stop means disposed between the top of said hinging means and the underside of said sprung mass to prevent said hinging means from moving above the level of said shaft of said empty car spring means.

9. In a rail car support at each longitudinal end of a rail car, each support having a car truck having at least one axle with a journal box at each end of the axle and a torque reactive spring means disposed between each said journal box and sprung mass of said car; the combination of an empty car spring means functioning only within the weight of an empty car and a loaded car spring means functioning under the weight of a loaded car, each loaded car spring means comprising a single elastomeric bushing bondedly interconnecting a pair of concentrically disposed tubular hubs, a hub of each said loaded car spring being integral with a longitudinally extending torque radius arm hinged in support of the sprung mass at one of its ends to said sprung mass at an elevation higher than the axis of said axles, whereby, as the weight of the sprung mass shifts to the outside of a curve due to centrifugal force as said car trucks engage a track curve, the wheel base on the outside of the car curve is increased and the wheel base at the inside of the curve is decreased to align each axle with the angle of track curve thereby reducing friction and wear between rail and wheel, said loaded car spring means is disposed concentrically of each said journal box, means hinging said empty car spring means to the free end of each said torque arm which is integral with the inner hub of said loaded car spring means, said empty car spring means being bushed on a shaft clamped to the sprung mass between adjacent axles of two axle trucks of the car, said shaft being centered vertically above said hinging means and stop means disposed between the top of said hinging means and the underside of said sprung mass to prevent said hinging means from moving above the level of said shaft of said empty car spring means and wherein there are loaded car spring means disposed concentrically at opposite ends of a rail car bolster extending transversely of the car, the inner hub of said loaded car spring means is bonded on an elastomeric bushing of low torsion resistance, said bushing bonded concentrically on said bolster, said torque arm integral with said inner hub extends forwardly from the loaded car spring element on one side of the car and said torque arm integral with said inner hub extends rearwardly from the loaded car spring element on the other side of the car thereby offsetting torsional stress on said bolster.

10. The combination of claim 9, wherein said empty car spring means is disposed in the end of each torque arm adjacent the journal box and means are provided for hinging said empty car spring means and the end of each torque arm to said journal box.

* * * * *